Jan. 31, 1961 D. BOLTON 2,970,253

AMPLIFIER CIRCUITS

Filed Sept. 13, 1957 2 Sheets-Sheet 1

Jan. 31, 1961 D. BOLTON 2,970,253

AMPLIFIER CIRCUITS

Filed Sept. 13, 1957 2 Sheets-Sheet 2

United States Patent Office 2,970,253
Patented Jan. 31, 1961

2,970,253

AMPLIFIER CIRCUITS

Denis Bolton, London, England, assignor to Westinghouse Electric Corporation, East Pittsburgh, Pa., a corporation of Pennsylvania Filed Sept. 13, 1957, Ser. No. 683,837
1 Claim. (Cl. 321—25)

This invention relates to magnetic amplifier circuits in general, and in particular, to polyphase magnetic amplifier circuits.

The double Y three phase and six phase type rectifiers can be adapted for magnetic amplifier operation by connecting a saturable reactor in series with each secondary winding of the rectifier transformers. The total output current can then be controlled by normal current feedback methods. If all the saturable reactors are identical and the rectifiers have the same characteristics, then the system will operate in a satisfactory manner. The operation using unmatched commercially built reactors and rectifiers may produce undesirable characteristics, particularly where the rectifier transformers comprise three single phase transformers.

It is an object of this invention to provide an improved polyphase magnetic amplifier circuit.

It is a further object of this invention to provide an improved polyphase magnetic amplifier circuit which may use unmatched reactors and rectifiers and which improves the input-output characteristics of the circuit.

Further objects of this invention will become apparent from the following description taken in connection with the accompanying drawings. In said drawings for illustrative purposes only, are shown preferred forms of the invention.

In the above described drawings, the manner in which the windings have been wound on the magnetic core members of the saturable reactors has been denoted by the polarity dot convention. This convention denotes direction of saturation; that is, current flowing into the polarity dot end of a winding will drive the inductively associated core toward positive saturation. Current flowing out of the polarity dot end of a winding will drive the inductively associated core away from positive saturation.

Figure 1:
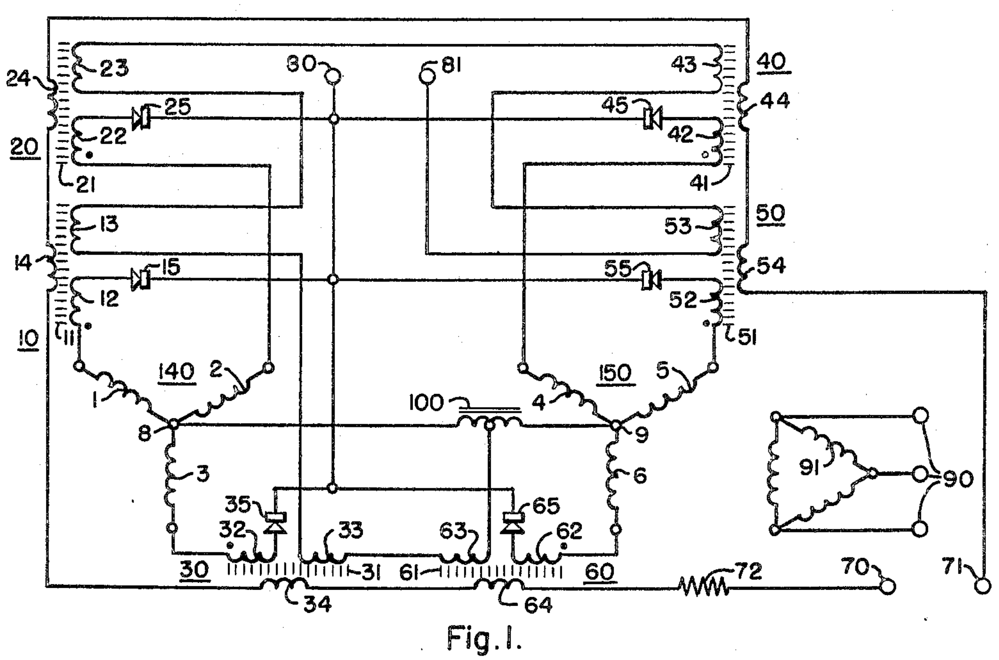
Figure 1 is a schematic diagram of a conventional doubly Y three phase magnetic amplifier circuit.

Referring to Fig. 1, there is illustrated a conventional double Y three phase magnetic amplifier circuit with output feedback. In general, the apparatus shown in Fig. 1 comprises a main transformer having a delta-connected primary 91 connected to a three phase alternating current voltage by the terminals 90 and a pair of Y-connected secondaries 140 and 150. Each leg of the Y-connected secondaries 140 and 150 have connected in series one of the saturable reactors 10, 20, 30, 40, 50 and 60. The above numbered saturable reactors have a common control circuit connected to a pair of terminals 70 and 71. The output for the system is obtained at a pair of terminals 80 and 81.

The Y-connected secondary 140 has a center tap 8 and windings 1, 2 and 3. The Y-connected secondary 150 has a center tap 9 and windings 4, 5 and 6. A center tapped interphase transformer 100 is connected between the center taps 8 and 9.

The saturable reactor 10 comprises a magnetic core member 11 having inductively disposed thereon a load winding 12, a feedback winding 13 and a control winding 14. The saturable reactor 20 comprises a magnetic core member 21 having inductively disposed thereon a load winding 22, a feedback winding 23 and a control winding 24. The saturable reactor 30 comprises a magnetic core member 31 having inductively disposed thereon a load winding 32, a feedback winding 33 and a control winding 34. The saturable reactor 40 comprises a magnetic core member 41 having inductively disposed thereon a load winding 42, a feedback winding 43 and a control winding 44. The saturable reactor 50 comprises a magnetic core member 51 having inductively disposed thereon a load winding 52, a feedback winding 53 and a control winding 54. The saturable reactor 60 comprises a magnetic core member 61 having inductively disposed thereon a load winding 62, a feedback winding 63 and a control winding 64.

The winding 1, the load winding 12 of the saturable reactor 10 and a rectifier 15 are connected in series circuit relationship between the center tap 8 of the Y-connected secondary 140 and the output terminal 80. The winding 2, the load winding 22 of the saturable reactor 20 and a rectifier 25 are connected in series circuit relationship between the center tap 8 of the Y-connected secondary 140 and the output terminal 80. The winding 3, the load winding 32 of the saturable reactor 30 and a rectifier 35 are connected in series circuit relationship between the center tap 8 of the Y-connected secondary 140 and the terminal 80. The winding 4, the load winding 42 of the saturable reactor 40 and a rectifier 45 are connected in series circuit relationship between the center tap 9 of the Y-connected secondary 150 and the output terminal 80. The winding 5, the load winding 52 of the saturable reactor 50 and a rectifier 55 are connected in series circuit relationship between the center tap 9 of the Y-connected secondary 150 and the output terminal 80. The winding 6, the load winding 62 of the saturable reactor 60 and a rectifier 65 are connected in series circuit relationship between the center tap 9 of the Y-connected secondary 150 and the output terminal 80.

A control circuit for the polyphase magnetic amplifier circuit comprises a resistor 72, the control winding 64 of the saturable reactor 60, the control winding 34 of the saturable reactor 30, the control winding 14 of the saturable reactor 10, a control winding 24 of the saturable reactor 20, the control winding 44 of the saturable reactor 40 and the control winding 54 of the saturable reactor 50 connected in series circuit relationship between the input terminals 70 and 71.

A current feedback circuit for the polyphase magnetic amplifier circuit comprises the feedback winding 53 of the saturable reactor 50, the feedback winding 43 of the saturable reactor 40, the feedback winding 23 of the saturable reactor 20, the feedback winding 13 of the saturable reactor 10, the feedback winding 33 of the saturable reactor 30 and the feedback winding 63 of the saturable reactor 60 connected in series circuit relationship between the output terminal 81 and the center tap of the interphase transformer 100.

The operation of the conventional apparatus illustrated in Fig. 1 is known to those skilled in the art, but will be explained in brief for the purposes of this application. The double Y three phase rectifier produces an output at the terminals 80 and 81 in conformance with the three phase alternating current voltage applied to the terminals 90 of the delta-connected primary 91. An input signal applied to the terminals 70 and 71 supplies ampere turns which cooperate with the ampere turns supplied by the feedback windings connected in the load circuit to regulate the flux in the magnetic core members of the saturable reactors. This flux level determines the period of time that it will take to drive the various saturable reactors to saturation and thus, determines the amount of output at the terminals 80 and 81.

Figure 3:
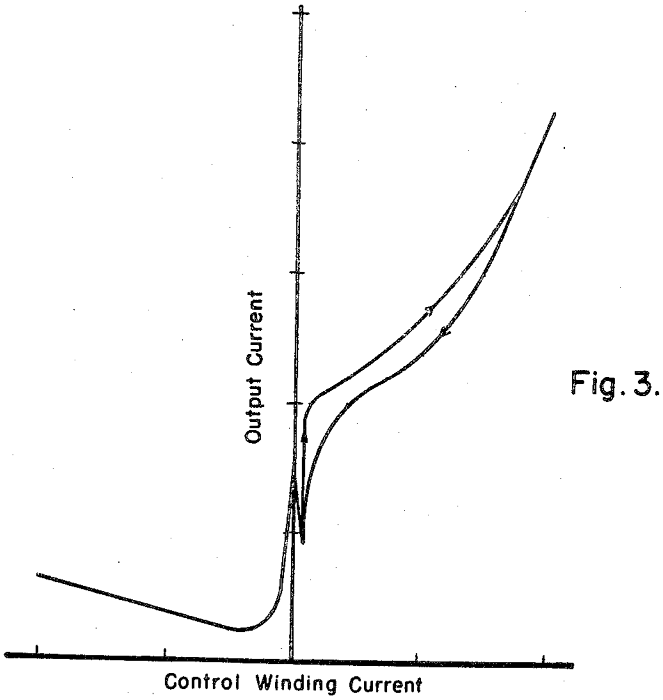
Fig. 3 is a graphical representtion of an input-output characteristic of the apparatus illustrated in Fig. 1.

If all the saturable reactors are identical and the rectifiers have the same characteristics, then the above-described system will operate in a satisfactory manner. However, the operation using unmatched, commercially built reactors and rectifiers may produce undesirable characteristics, especially where the rectifier transformers comprise three single phase transformers. A characteristics such as the one illustrated in Fig. 3 is typical of the results that might be obtained when unmatched saturable reactors are used. The unmatched saturable reactors will produce flux unbalance in the magnetic core members during the resetting periods, which, in turn, effects the current flowing during the firing periods. As is illustrated in Fig. 3, the input-output characteristic was satisfactory down to a given level of output current, but as the current was further reduced, a point was reached when the load suddenly shifted from both Y-connected secondaries 140 and 150 acting together, to a single Y-connected secondary supplying all of the load alone. This results in the saturation of the supply transformers and a substantial increase in supply current.

Figure 2:
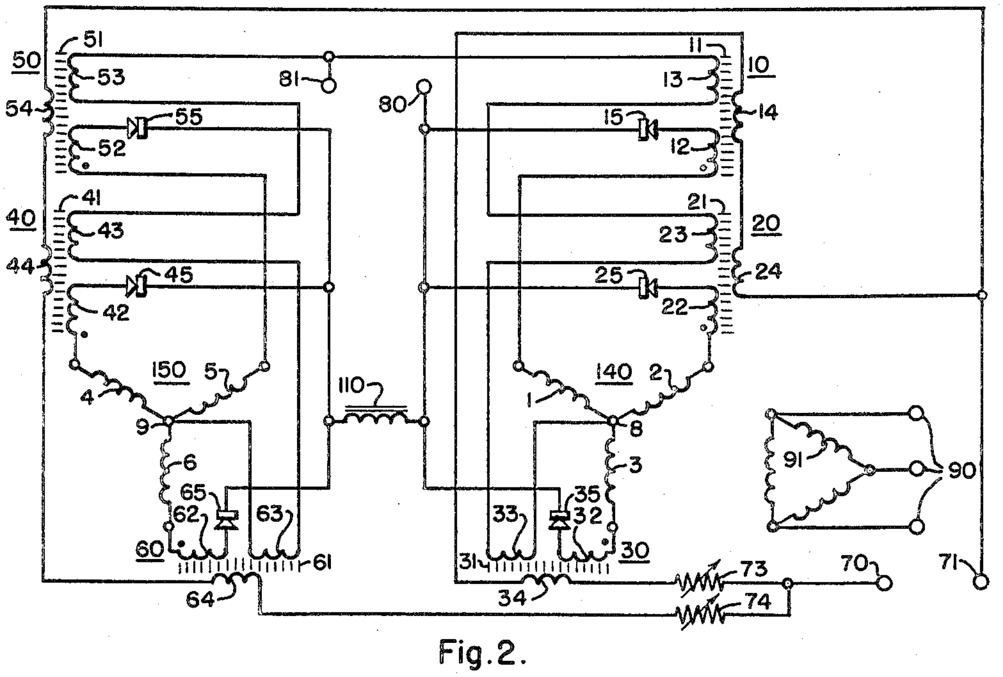
Fig. 2 is a schematic diagram of a double Y three phase magnetic amplifier circuit embodying the teachings of this invention.

Referring to Fig. 2, there is illustrated a double Y, three phase rectifier, using a three phase magnetic amplifier circuit to control the output current, embodying the teachings of this invention. Like components of Figs. 1 and 2 have been given the same reference characters. The main distinction between the apparatus illustrated in Figs. 1 and 2 is that in Fig. 2, the interphase transformer 100 is omitted and a choke coil 110 is connected between the two Y-connected secondaries 140 and 150. In addition, a rearrangement of the control windings of the saturable reactors has been made to divide them into two groups corresponding to the two Y-connected secondaries 140 and 150. The control circuit connected to the input terminals 70 and 71 now has two parallel branches. One branch includes an adjustable resistor 73, the control winding 34 of the saturable reactor 30, the control winding 14 of the saturable reactor 10 and the control winding 24 of the saturable reactor 20. The other branch includes an adjustable resistor 74, the control winding 64 of the saturable reactor 60, the control 44 of the saturable reactor 40 and the control winding 54 of the saturable reactor 50. The two parallel branches just described are prevented from feeding into one another by making the resistance values of the adjustable resistors 73 and 74 large and supplying each combination from a low impedance control source connected to the terminal 70 and 71.

The feedback windings of the saturable reactors have also been rearranged into two groups corresponding to the Y-connected secondaries 140 and 150. The feedback winding 13 of the saturable reactor 10, the feedback winding 23 of the saturable reactor 20 and the feedback winding 33 of the saturable reactor 30 have been connected in series circuit relationship between the return output terminal 81 and the center tap 8 of the Y secondary 140. The feedback winding 53 of the saturable reactor 50, the feedback winding 43 of the saturable reactor 40 and the feedback winding 63 of the saturable reactor 60 have been connected in series circuit relationship between the return output terminal 81 and the center tap 9 of the Y secondary 150.

The saturable reactors have now been divided into two groups corresponding to the Y-connected secondaries 140 and 150; thus, the output current of each group is regulated separately. The choke 110 and the control winding connections prevent interaction between the two Y-connected systems 140 and 150 during the resetting periods of the magnetic core members of the saturable reactors. The reconnection of the output current feedback system insures that the same output current flows from each Y-connected secondary.

Figure 4:
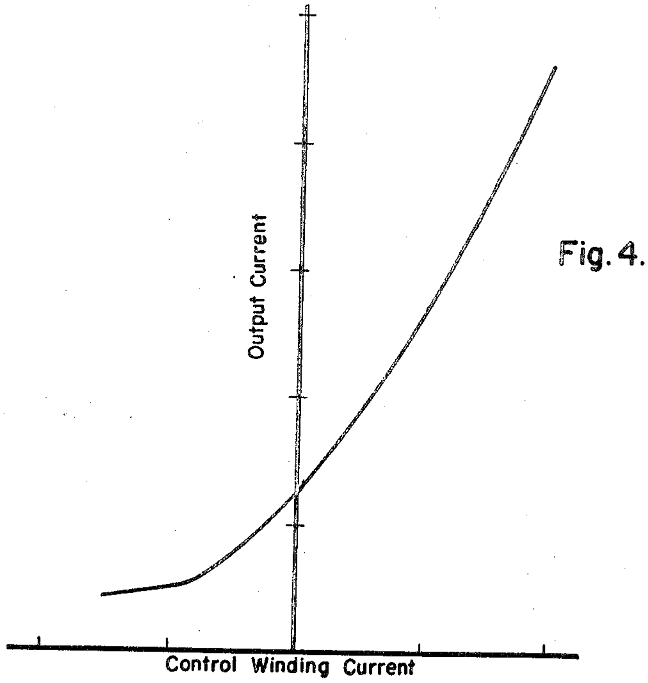
Fig. 4 is a graphical representation of an input-output characteristic of the apparatus illustrated in Fig. 2.

Experiments using the same saturable reactors and selenium rectifiers used in the test of the apparatus illustrated in Fig. 1 is shown in the graphically represented transfer characteristic in Fig. 4. As can be seen from the characteristic illustrated in Fig. 4, smooth control is obtained over the full input-output range. Thus, the apparatus illustrated in Fig. 2 embodying the teachings of this invention permits the use of commercially available unmatched cores, does not require any added components and yet provides smooth control over the full range of the input-output characteristic.

In conclusion, it is pointed out that while the illustrated example constitutes a particular embodiment of my invention, I do not limit myself to the exact details shown, since modifications of the same may be varied without departing from the spirit of this invention.

I claim as my invention:

In a polyphase magnetic amplifier circuit, in combination, a rectifier system having a transformer with a plurality of Y-connected secondaries, each leg of each said Y-connected secondary being connected through a rectifying means to an output terminal, a choke coil connecting the outputs of said plurality of Y-connected secondaries, a saturable reactor for each leg of each said Y-connected secondary, each said saturable reactor comprising a magnetic core member having inductively disposed thereon a load winding, a feedback winding and a control winding, said saturable reactors being divided into groups corresponding to each said Y-connected secondary, each leg of each said Y-connected secondary having a load winding of one of said saturable reactors of said groups connected in series, said feedback windings of each said group of saturable reactors being connected in series between a return output terminal for said rectifier system and a center tap of said Y-connected secondary corresponding to said group, said control windings for each said group being connected in series with a resistance means for applying a control signal for said polyphase magnetic amplifier system, said resistance means being large enough to prevent interaction with other control winding groups.

References Cited in the file of this patent

UNITED STATES PATENTS

| | | |
|---|---|---|
| 2,126,790 | Logan | Aug. 16, 1938 |
| 2,503,880 | Mah | Apr. 11, 1950 |
| 2,632,870 | Boyer et al. | Mar. 24, 1953 |
| 2,770,738 | Vance | Nov. 13, 1956 |
| 2,830,258 | Conrath | Apr. 8, 1958 |

FOREIGN PATENTS

| | | |
|---|---|---|
| 670,081 | Great Britain | Apr. 16, 1952 |

OTHER REFERENCES

"Magnetic Amplifiers" (1948), Vickers Electric Division Bulletin No. VT–2000, Figure 41 relied on.